Nov. 10, 1936.   H. G. BUCK ET AL   2,060,170
WINE DISPENSING RACK
Filed Dec. 30, 1935
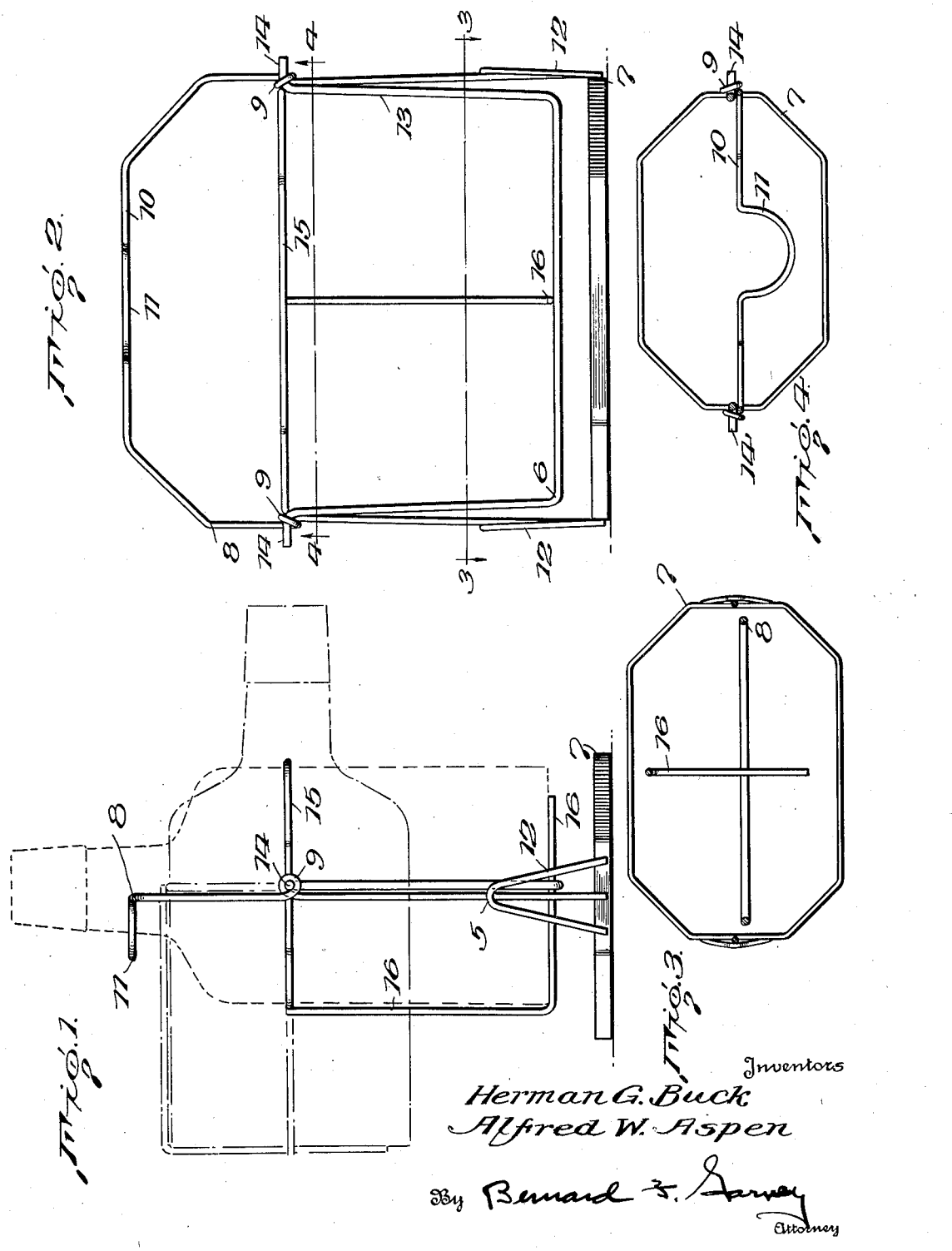
Inventors
Herman G. Buck
Alfred W. Aspen
By Bernard F. Garvey
Attorney Patented Nov. 10, 1936

2,060,170

UNITED STATES PATENT OFFICE 2,060,170

WINE DISPENSING RACK

Herman G. Buck, Egg Harbor City, N. J., and Alfred W. Aspen, Philadelphia, Pa., assignors to L. N. Renault & Sons, Inc., Egg Harbor City, N. J.

Application December 30, 1935, Serial No. 56,810

2 Claims. (Cl. 248—141)

The present invention consists of a wine dispensing rack especially adapted for use in hotels, cafes and the like where wine is vended in bulk.

The law of many states makes mandatory the dispensing of alcoholic beverages, for sale, from the original packages. This is burdensome and unwieldy, frequently with resultant loss of a considerable portion of the contents of the package, where, as is often the case with wine, the beverage is dispensed from a gallon container. With the device of the present invention, the original package may be conspicuously displayed on the bar, serving counter, table, tray or the like, and the contents dispensed with facility while the package is still mounted in a supporting and dispenser rack made in accordance with the present invention.

It is further within the contemplation of this invention to provide a simple and inexpensive rack, with a substantial supporting base to prevent casual displacement of the beverage container, the latter being supported above the base and capable of bodily movement through an arc sufficient to dispense the contents of the container.

Other objects of the invention will be apparent from the following description of the present preferred form of the invention, taken in connection with the accompanying drawing, wherein:—

Fig. 1 is a side elevational view of a dispensing rack constructed in accordance with the present invention illustrating its application, dotted lines being employed to show a dispensing position of the rack.

Fig. 2 is a front elevational view of the rack per se.

Fig. 3 is a cross sectional view of the rack taken on the line 3—3 of Fig. 2 looking in the direction of the arrows, and Fig. 4 is a cross sectional view taken on the line 4—4 of Fig. 2 looking in the direction of the arrows, and showing to advantage the relative position of the container holding cradle with respect to the base frame.

The rack of the present invention embodies two units, one of which, generally designated 5, is fixed, and the other, indicated at 6, is movably mounted in the first unit.

The unit constituting the part 5 includes a base 7, and an upstanding frame 8. The base is preferably of skeleton design and is polygonal to provide a substantial support which will not be easily tilted or displaced. The sides of the frame, as shown to advantage in Fig. 2, are canted inwardly toward their upper terminals, each having an intermediate portion thereof formed to provide a looped eye 9. The upper ends of the sides of the frame, issue into a connecting bar 10, which is parallel to the base 7, and is laterally depressed midway its ends to provide a bottle neck receiving open loop 11. The lower ends of the frame sides are connected by struts 12, which latter are anchored to the ends of the base 7.

The second or movable part of the rack 6, consists of a cradle, which comprises a U-shaped rod 13, the free ends of which are bent outwardly at right angles to provide pintles 14, which extend through the eyes 9. At approximately the jointure of the pintles with the sides of the U-shaped rod 13, the opposite ends of a container embracing band 15 are fixedly secured. The said band may be of any desired configuration. However, it is preferably shaped to conform to the contour of the container which is adapted to be mounted therein. In the present instance, the band is shown to be of octagonal configuration to conform to the shape of a gallon wine bottle of standard manufacture. The side of the band 15, which lies below the open loop 11, is engaged by one end of an abutment bar 16. The opposite end of the bar intersects the base of the U-shaped rod 13, and projects forwardly appreciably beyond the latter.

In use of this device, the bottom of the bottle is engaged through the band 15, and with the bottom of the cradle, as shown in Fig. 1. When in this position, the neck of the bottle rests in the open loop 11. The loop 11 prevents lateral movement of the bottle rearwardly in the rack, but forward displacement is permitted by tilting the cradle on the axis. The abutment bar 16 of the cradle prevents the bottle from being displaced through the back of the cradle. It is desired to leave the front of the cradle open, as shown, so that the bottle label may be seen. It will be noted, especially upon reference to Figs. 2 and 4 of the drawing, that the sides of the cradle bind against the upright sides of the frame 8 just below the eyes 9. The friction thus created requires a slight pressure to be exerted on the cradle in operating the latter for tilting the bottle to a dispensing position. In this way the operator completely controls the volume of liquid poured from the container.

It is, of course, understood, that I have herein shown and described only a preferred form of the invention. Preferably the rack is made of metal, although other materials may be used.

Furthermore, the rack may vary in contour, depending upon the size and shape of the bottles which are to be supported, and whose contents are to be dispensed.

What is claimed is:

1. A rack for use in dispensing beverages from original containers including a base with uprights and a connecting bar therefor, a container supporting member pivotally mounted in the uprights and movable thereon to tilt the container in one direction, a portion of the connecting bar being offset for the reception of a part of the container to prevent movement of the container in the opposite direction.

2. A rack for use in dispensing beverages from containers including a base with uprights, intermediate portions of which are formed to provide eyes, a connecting bar for the uprights, a container supporting cradle including pintles pivotally mounted in said eyes to permit tilting the container in one direction, a portion of the connecting bar for the uprights being offset for the reception of a part of the container to prevent movement of the latter in the opposite direction.

HERMAN G. BUCK.
ALFRED W. ASPEN.